(12) United States Patent
Jaralla

(10) Patent No.: US 7,731,803 B2
(45) Date of Patent: Jun. 8, 2010

(54) DESCALING AND CORROSION INHIBITING METHOD

(75) Inventor: Abdulghani Jaralla, Christchurch (NZ)

(73) Assignee: Saudi Arabian Oil Company, Dhahran (SA)

( * ) Notice: Subject to any disclaimer, the term of this patent is extended or adjusted under 35 U.S.C. 154(b) by 866 days.

(21) Appl. No.: 10/533,592

(22) PCT Filed: Nov. 14, 2003

(86) PCT No.: PCT/US03/36558

§ 371 (c)(1), (2), (4) Date: Nov. 16, 2005

(87) PCT Pub. No.: WO2004/046271

PCT Pub. Date: Jun. 3, 2004

(65) Prior Publication Data

US 2006/0142170 A1    Jun. 29, 2006

(51) Int. Cl.
*B08B 3/04* (2006.01)
*B08B 3/10* (2006.01)

(52) U.S. Cl. .............. 134/28; 134/26; 134/30; 134/22.1; 134/22.11; 134/22.14; 134/22.19; 510/265; 510/266; 510/253

(58) Field of Classification Search ......... 510/175–253, 510/265, 266; 252/86–149; 134/22.1–41
See application file for complete search history.

(56) References Cited

U.S. PATENT DOCUMENTS

| 3,135,632 | A | * | 6/1964 | Lucas et al. | 134/28 |
| 3,460,989 | A | * | 8/1969 | Rusch | 134/3 |
| 4,541,945 | A | * | 9/1985 | Anderson et al. | 510/253 |
| 6,228,823 | B1 | * | 5/2001 | Morinaga et al. | 510/175 |
| 6,289,286 | B1 | * | 9/2001 | Andersson et al. | 702/19 |
| 2003/0083214 | A1 | * | 5/2003 | Kakizawa et al. | 510/175 |

* cited by examiner

*Primary Examiner*—Lorna M Douyon
*Assistant Examiner*—Tri V Nguyen
(74) *Attorney, Agent, or Firm*—Abelman, Frayne & Schwab

(57) ABSTRACT

The present invention is directed to a composition, and a process employing same, for descaling, cleaning and inhibiting the corrosion of process equipment made of steel by including an inhibitory effective amount of acridine orange in the composition.

2 Claims, No Drawings

DESCALING AND CORROSION INHIBITING METHOD

BACKGROUND OF THE INVENTION

1. Field of the Invention

This invention relates to a cleaning, descaling and corrosion inhibiting composition and a process for employing same.

2. Description of the Prior Art

Equipment used in power plants, chemical and petrochemical plants, paper mills, sugar mills, pipelines, air conditioners in large buildings and many other industrial environments are subject to the formation of scale, either by circulating water or by process compounds. This includes all types of heat exchangers, boilers, vessels, piping and other equipment. Precipated solids reduce the heat transfer efficiency and oftentimes cause tube failure due to overheating which may result in plugging or fouling of the equipment. To prevent interference with industrial processes, cleaning of the metal surfaces of the equipment employed therein is required. The water-formed precipitates are generally inorganic in nature, especially precipitates formed in hot closed systems, for example, in steam generators or heat exchangers. Common deposits which are found include iron oxides (magnetite and hematite), sulfides, alkaline earth carbonates, sulfates, and silicates.

Hydrochloric acid is widely used for the chemical cleaning of structural steel from which heat transfer and piping systems are fabricated. Hydrochloric acid forms soluble products which serve to dissolve calcium or magnesium carbonates. Hydrochloric acid, does not, however, dissolve sulfates or silicates. Therefore, other chemicals must be mixed or incorporated with the hydrochloric acid. It is also well known that hydrochloric acid is highly corrosive. In addition, if copper salts are present in the scale, they will dissolve and reprecipitate on iron surfaces causing severe localized corrosion.

It is an object of the present invention to provide a non-toxic, industrial descaling and cleaning composition which is effective in removing scales and oxides from the surfaces of the process equipment used in various industries while avoiding corrosion to the equipment.

SUMMARY OF THE INVENTION

A highly effective industrial cleaning composition which is effective in descaling without causing corrosion has now been found which comprises a mixture of hydrochloric acid, hydrofluoric acid, one or more chelating agents, a surfactant, a copper complexing agent, and a non-toxic inhibitor which serves to block the anodic and cathodic sites on the steel surfaces of the process equipment.

DETAILED DESCRIPTION OF THE INVENTION

The composition of the present invention includes as the non-toxic inhibitor from 40 to 200 parts per million, preferably from 60 to 100 parts per million, and most preferably 80 parts per million of acridine orange. The chemical formula for acridine orange is N,N,N'N'-tetramethyl-3,6-acridinediamine monohydrochloride. The use of this compound has been found to inhibit or block the anodic and cathodic site in structural steel of the type that is commonly used in the fabrication of a variety of pieces of process equipment The benefits of using acridine orange (AO) are multifaceted and are as follows:

1. AO has fast and direct protonation when added to acidic solutions. The protonation process is a charge transfer process, viz., flow independent.
2. The AO inhibitor molecules bind strongly to metal surfaces.
3. The free flat aromatic rings having a surface area of 38 A°, are bound in a plane which is parallel to the metal surface, such that the position of the positively charged hydrogen ring in AO is close to the predominant negatively charged electric layer on the metal surface.

The composition includes from about 5% to about 15%, by weight, hydrochloric acid, preferably from 5% to 10%, and most preferably 8% acid, which serves to remove most calcium, magnesium and iron oxides.

The composition also preferably includes 1% to 5%, by weight, preferably 1.5% of hydrofluoric acid, which aids in the removal of silicate containing scales. The conjoint use of hydrochloric acid and hydrofluoric acid serves to accelerate the dissolution of many very hard and complex scale formations.

While various chelating agents can be employed in the composition and process of the present invention, such as EDTA, citric acid, HEDTA, etc., it has been found that a mixture of 2% citric acid and 2% EDTA is preferred since it is extremely effective in dissolving iron oxide deposits and also deposits containing copper oxides. In point of fact, even sulfate-containing deposits will be dissolved when this mixture of chelating agents is employed.

The inclusion of from about 50 to about 200 parts per million (ppm), preferably 100 ppm of thiourea, will insure the maintenance of any dissolved copper in a soluble state. In the absence of such a copper complexing agent, copper oxides which are present in any scale, will dissolve and then plate out as metallic copper causing severe pitting of the industrial process equipment and the piping systems.

In addition, while it is optional, it has been found to be beneficial if the descaling composition includes about 0.1 grams/liter of a neutral emulsifying agent, such as alkyl benzene sulfonate.

It has also been found that the benefits of the process of the present invention can best be achieved by employing a temperature of about 300° K or above for a period of about one (1) to about ten (10) hours, with eight (8) hours being preferred.

For a fuller understanding of the nature and objects of this invention, the following specific examples are given. These examples, however, are not to be construed as limiting the invention in any manner.

EXAMPLE 1

A series of 5.0 cm×2.5 cm mild steel specimens were prepared by cutting them from a single sheet of cold-rolled 1020 steel. The specimens were then polished under running tap water using a series of silicon carbide emery paper of 100, 400 and 600 grit, respectively, and then washed with distilled water and thereafter degreased with benzene and weighed on a Mettler AJ 100 electronic balance.

One group of prepared steel specimens were fully immersed in 500 cc of a cleaning and descaling solution containing 8% hydrochloric acid, 1.5% hydrofluoric acid, 80 ppm of acridine orange, 2% citric acid, 2% EDTA, 0.1 g/l of alkyl benzene sulfonate, 100 ppm thiourea and 80 PPM of acridine orange. This is referred to herein as the "inhibited solution".

Another group of steel specimens were also immersed in the foregoing cleaning and descaling solution except for the fact that the composition did not contain any acridine orange. This is referred to herein as the "uninhibited solution"

Potentiostatic polarization studies were carried out for both inhibited and uninhibited solutions under isothermal conditions at 303°, 313°, and 323° K and under controlled conditions of flow at 600, 1000 and 1400 rpm employing a potentiostat (Model 553-AMEL-Italy). The iron electrode was polarized from −900 mV to −100 mV (vs. saturated calomel electrode) at a sweep rate of 20 mV/min.

Another series of potentiostatic polarization studies were conducted for the heat transfer set of conditions, with a potential of −1000 mV being applied until a steady state heat flux was attained as indicated by the constant temperature reading from the thermocouples. Then the full polarization was carried out under isothermal conditions.

The duration of each of the weight loss experiments was eight (8) hours. At the conclusion of the test, the specimens were withdrawn, rinsed with water, then dried and reweighed. The percentage inhibitor efficiency was calculated by the following equation:

$$I\% = W_u - W_f / W_u \times 100.$$

EXAMPLE 2

Performance of the Inhibitor (AO) under Controlled Conditions of Heat and Mass Transfer Cathodic Region The effect of fluid flow, bulk temperature and heat transfer on the cathodic current density at a given cathodic potential of 0.1 V below the corrosion potential are shown in Tables 1, 2, and 3.

TABLE 1

The Cathodic Current Density mA/cm² for Uninhibited Chemical Cleaning Solution $I_{c,u}$ and Inhibited Solution $I_{c,I}$ and the Inhibition Efficiency I % under Isothermal Conditions. (Inhibitor Concentration 60 PPM) Temperature ° K

| | 303 | | | 313 | | | 323 | | |
|---|---|---|---|---|---|---|---|---|---|
| RPM | $I_{c,u}$ | $I_{c,I}$ | I % | $I_{c,u}$ | $I_{c,I}$ | I % | $I_{c,u}$ | $I_{c,I}$ | I % |
| 0 | 15 | 1.6 | 89 | 39 | 5.5 | 86 | 57 | 8.8 | 85 |
| 600 | 4.6 | 0.5 | 89 | 14 | 1.6 | 88.6 | 36 | 3.3 | 90.8 |
| 1000 | 4.6 | 0.46 | 90 | 14 | 1.6 | 88.6 | 34 | 3.0 | 91 |
| 1400 | 4.8 | 0.51 | 89.4 | 15 | 1.7 | 88.7 | 34 | 3.5 | 89.7 |

TABLE 2

The Cathodic Current Density, mA/cm², of Uninhibited Chemical Cleaning Solution Under 60 kW/m² Heat transfer (The Interfacial temperatures are Bracketed).

| | Bulk Temperature, ° K | | |
|---|---|---|---|
| RPM | 303 | 313 | 323 |
| 600 | 8 (322.7) | 19 (330.5) | 40 (339.9) |
| 1000 | 7.3 (315.9) | 17 (324.3) | 39 (333.7) |
| 1400 | 6.5 (312.3) | 16 (321.6) | 37 (331.4) |

TABLE 3

The Cathodic Current Density $I_{C,I}$, MA/cm², for Inhibited Chemical Cleaning Solution, under Heat Flux of 60 kW/m². I % is the Inhibitor Efficiency. Interfacial Temperature values are the same as in Table 2.

| | Bulk Temperature, K | | | | | |
|---|---|---|---|---|---|---|
| | 303 | | 313 | | 323 | |
| RPM | $I_{C,I}$ | I % | $I_{C,I}$ | I % | $I_{C,I}$ | I % |
| 600 | 0.65 | 92 | 2.3 | 88 | 4.2 | 89.5 |
| 1000 | 0.60 | 92 | 1.9 | 89 | 3.2 | 91.8 |
| 1400 | 0.58 | 91.1 | 1.7 | 89.4 | 2.8 | 92.4 |

It can be seen from Tables 1, 2 and 3 that the cathodic current density values are independent of the flow rate, while the increase in temperature (bulk or interfacial) has a significant effect in stimulating the cathodic process. This confirms the activation energy control of the cathodic reaction of hydrogen as the predominant reaction, as well as the lack of mass transfer effect on the adsorption processes of the inhibitor.

The increase in temperature (bulk or interfacial) has no significant effect on the inhibition efficiency, viz. the increase in temperature has no effect on the orientation of the adsorbed molecules or their geometry.

The high efficiency values are attributed to the ability of the inhibitor, acridine orange, to block the cathodic areas on the metal surface, leading to a significant reduction in hydrogen evolution.

EXAMPLE 3

Acridine orange (AO) also showed high performance in blocking the anodic sites, as shown in the data presented in Tables 4, 5 and 6 for both isothermal and heat transfer conditions.

TABLE 4

The anodic Current Density, mA/cm², for uninhibited Chemical Cleaning Solution $I_a$, U, Inhibited Solution $I_{a,I}$, and the Inhibitor Efficiency, I %, Under Isothermal Conditions Temperature, K

| | 303 | | | 313 | | | 323 | | |
|---|---|---|---|---|---|---|---|---|---|
| RPM | $I_{a,u}$ | $I_{a,I}$ | I % | $I_{a,U}$ | $I_{a,I}$ | I % | $I_{a,U}$ | $I_{a,I}$ | I % |
| 0 | 29 | 1.8 | 94 | 46 | 2.5 | 97 | 97 | 16 | 83.5 |
| 600 | 7 | 1.3 | 81 | 14 | 2.3 | 93.6 | 40 | 5.7 | 86 |
| 1000 | 6.8 | 1.3 | 81 | 15 | 2.0 | 86.7 | 36 | 4.8 | 87 |
| 1400 | 7.1 | 1.3 | 81.7 | 15 | 2.7 | 82 | 38 | 3.5 | 91 |

TABLE 5

The anodic Current Density, mA/cm², for uninhibited Chemical Cleaning Solution under 60 kW/m² Heat Transfer Rate. (The Interfacial Temperatures are bracketed).

| | Bulk Temperature K | | |
|---|---|---|---|
| RPM | 303 | 313 | 323 |
| 600 | 13 (322.7) | 23 (330.5) | 63 (339.9) |
| 1000 | 12 (315.9) | 23 (324.3) | 58 (333.7) |
| 1400 | 11 (312.3) | 20 (321) | 48 (331) |

TABLE 6

The Anodic Current Density $I_{a,I}$, mA/cm$^2$, for Inhibited Chemical Cleaning Solution and the Inhibitor Efficiency I %, under 60 kW/m$^2$, Heat Transfer Rate

| Bulk Temperature, K | 303 | | 313 | | 323 | |
|---|---|---|---|---|---|---|
| RPM | $I_{a,I}$ | I % | $I_{a,I}$ | I % | $I_{a,I}$ | I % |
| 600 | 1.8 | 86 | 4.1 | 82 | 12 | 81 |
| 1000 | 1.6 | 87 | 3.7 | 84 | 7.8 | 87 |
| 1400 | 1.4 | 87 | 3.3 | 83 | 6.0 | 87 |

The inhibition of the anodic sites (Tables 4-6) and cathodic sites (Tables 1-3) confirm the mixed effect of the inhibitor.

The invention is not limited to the embodiments described above. The detail involved in the description of these embodiments is for illustrative purposes only. Reasonable variations and modifications of this invention will be apparent to those skilled in the art without departing from the spirit and scope thereof.

What is claimed is:

1. A process for cleaning and inhibiting scale formation on the surfaces of process equipment which contacts circulating water and/or chemicals, which consists of:
    contacting the process equipment surfaces for a period of about 8 hours and at a temperature of about 300° C. and higher which is effective to effect cleaning and/or scale inhibition with a aqueous composition consisting of:
    a) about 8%, by weight, of hydrochloric acid;
    b) about 1.5%, by weight, of hydrofluoric acid;
    c) a chelating agent which is a mixture of about 2%, by weight, of EDTA and about 2%, by weight, of citric acid;
    d) about 100 ppm of thiourea as a copper complexing agent;
    e) about 40 to about 200 ppm of acridine orange; and
    f) optionally a neutral emulsifying agent.

2. The process of claim 1, wherein the neutral emulsifying agent is present in the composition in an amount of 0.1 g/l.

* * * * *